Dec. 7, 1937.  H. H. WIXON  2,101,121
SOUND RECORDING AND REPRODUCING EQUIPMENT
Filed May 3, 1929  2 Sheets-Sheet 1
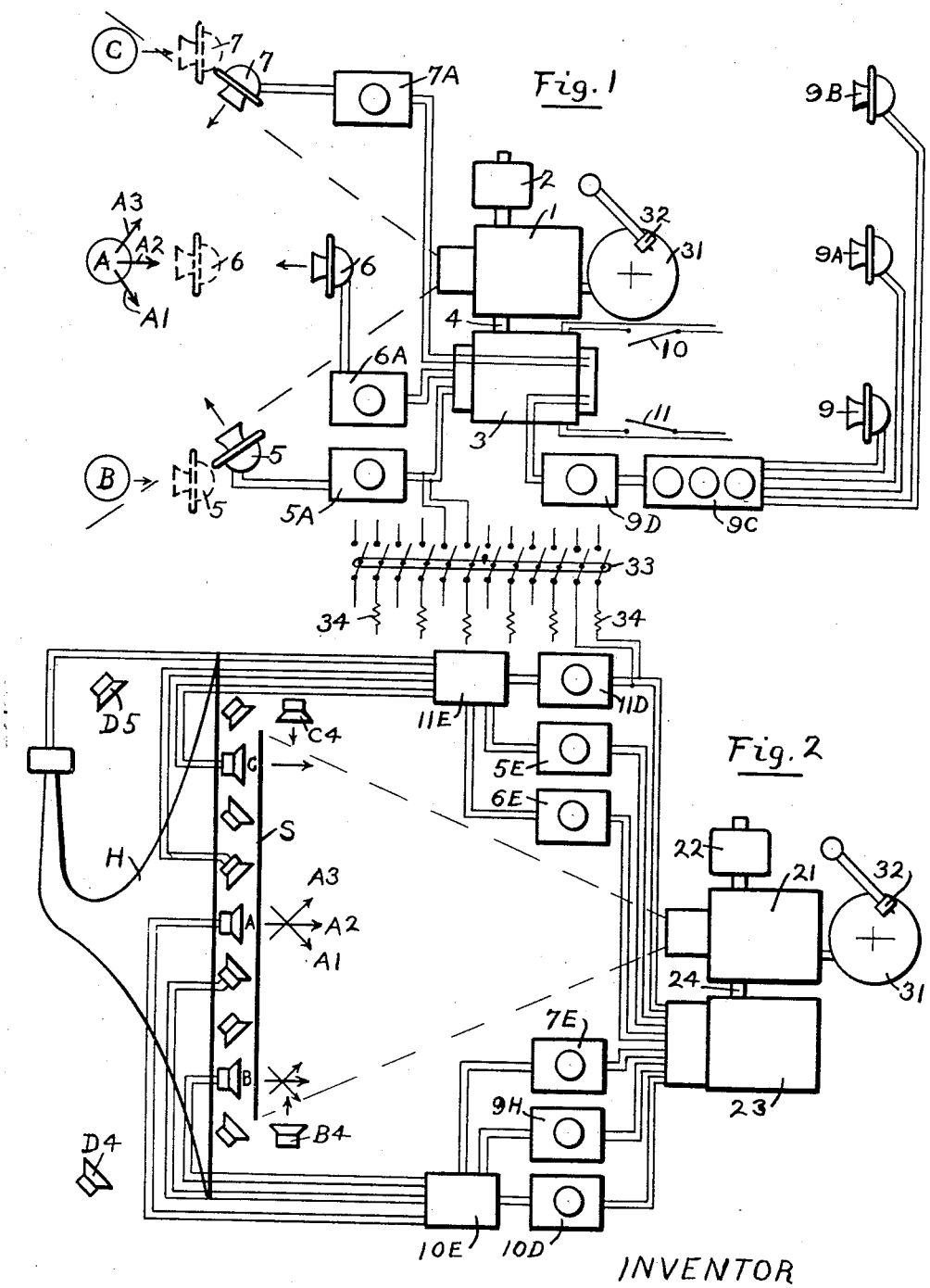
INVENTOR
Howard H. Wixon Dec. 7, 1937.  H. H. WIXON  2,101,121
SOUND RECORDING AND REPRODUCING EQUIPMENT
Filed May 3, 1929    2 Sheets-Sheet 2
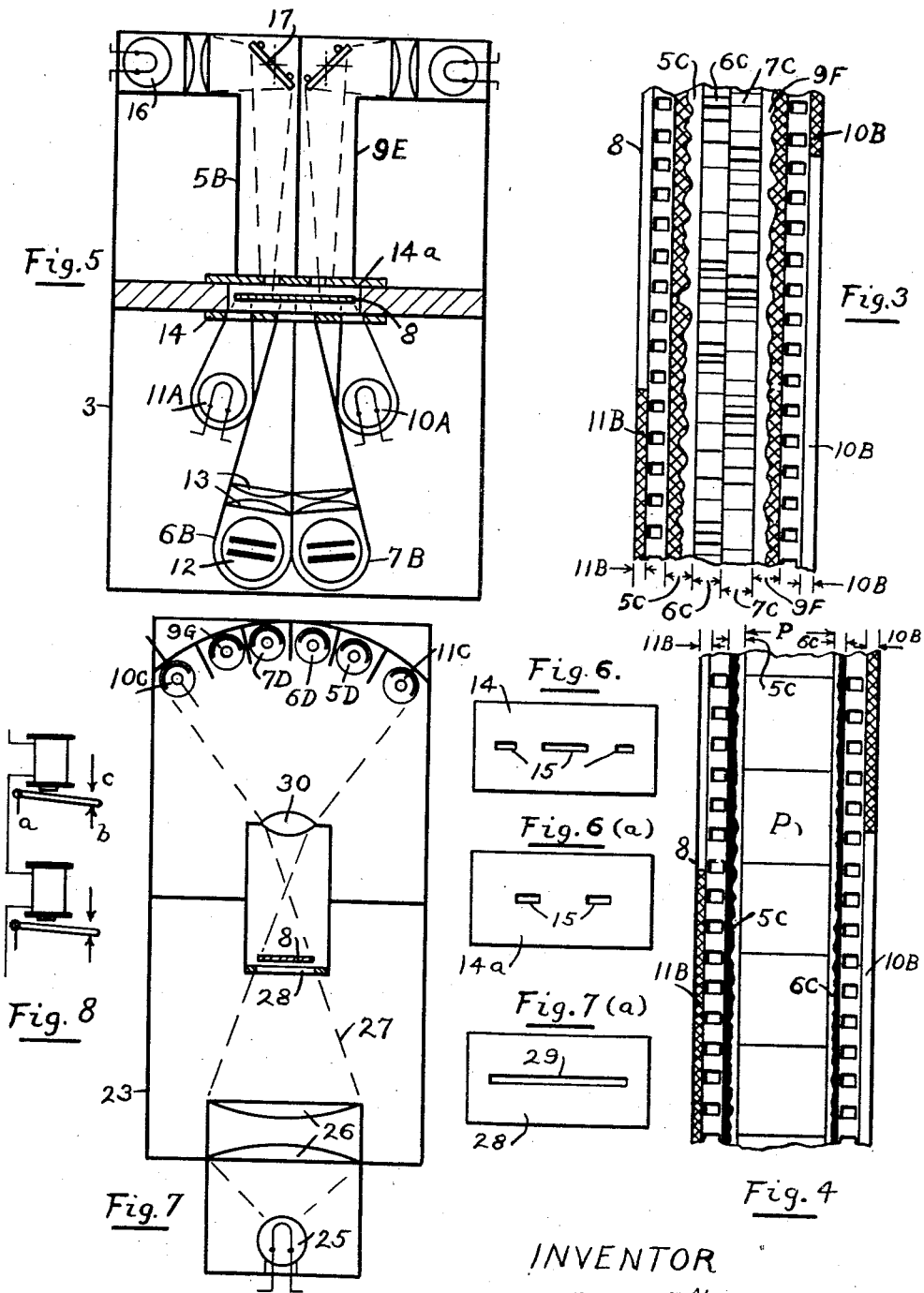
INVENTOR

Patented Dec. 7, 1937

2,101,121

UNITED STATES PATENT OFFICE 2,101,121

SOUND RECORDING AND REPRODUCING EQUIPMENT

Howard H. Wixon, Chicago, Ill.

Application May 3, 1929, Serial No. 360,252

16 Claims. (Cl. 179—100.3)

My invention relates to sound recording and reproducing means, and while the same may be used independently, my invention relates further and particularly to the means employed to produce the sound effects hereinafter described in connection with or synchronized with motion pictures.

The broad object of my invention is to make possible the more natural reproduction of sound effects in connection with motion pictures, though my invention is not limited to use with motion pictures, and my invention is hereinafter more fully described with the new features thereof particularly pointed out or specified in the appended claims.

More specific objects of my invention appear in the following description and relate to certain qualities or effects of sound which it is desired to reproduce and which have heretofore not been known or used either in sound recording and reproduction or synchronized with motion pictures.

One of these qualities of sound which it is an object to reproduce, is the effect or quality of "movement" (of direction or change of direction of sound), as for instance when a person talks and in turning from side to side will change the direction and apparently move the sound from one side to the other, so that the listening person will be conscious of the talking person's actual turning movements even though unseen. I accomplish this object by recording and reproducing the variable degree of intensity of sound according to the directional characteristics thereof.

Another of these qualities of sound which it is an object to reproduce, is the "placement" or position from which the sound comes, which is the quality by which we are conscious of the actual place or position of the person or thing from which the sound comes. The reproduction of this quality is particularly important in connection with motion pictures in order to identify or associate the sound as coming from the person or thing shown in the picture, and this quality also serves to differentiate or distinguish between persons and objects in a "sound conscious" manner. I accomplish this object by recording and reproducing the sound as nearly as possible at the actual place from which it is supposed to come in or associated with something in a picture.

A further quality which it is an object to reproduce, is the effect or quality of "movement of position", or the quality by which we are sound conscious that a person or thing moves in space, as for instance when a person moves from one place to another. I accomplish this object in my invention by transferring the sound (in recording and reproduction) from one place to another to correspond to the picture.

Still a further quality which it is an object to reproduce, is the effect or quality of "size" by which we are sound conscious of the size or space from which the sound comes, as for instance the sound of a single person or instrument is decidedly limited or "localized" as compared to that of a large chorus or band which is spread over a relatively large space. I accomplish this object by the separation of sounds in recording to an extent sufficient to enable the reproduction thereof more less distinctly in the relative space to correspond to the picture.

Another object of my invention is the recording of a large amount of sound detail and the reproduction thereof with a large amount of sound energy without unnatural forcing, which is otherwise much more limited in practice.

All of these qualities are more or less present and continuously variable and may be simultaneously present in association with a moving picture, and the more or less complete reproduction of the sound effects therewith involves the division of the picture area into both horizontal and vertical sections for sound recording and reproduction, and also involves sound reproduction at more or less depth in back of the picture screen or even in front of or at some distinct distance or position related to the said screen. In practice these qualities are intended to be more or less distinctly recorded upon separate and distinct "sound tracks" which are capable of separate and distinct reproduction which is further elaborated by a "switch track", and this general system is referred to as a "multiple channel" or "multiple track" system.

All of the individual parts or things which are necessary to the construction and operation of my invention are known and used in other systems or devices, though they have not previously been used according to my distinct invention or variations thereof. The drawings are therefore largely in the nature of diagrams which represent detail or general construction of parts which are known or capable of being made by others without further description or drawings.

Any process of recording and reproducing sound impressions may be used in my invention; some of which are mechanical or electrical recording on a disk or cylinder, or mechanically or electrically produced light variations on a plate or film or directly on the motion picture film by the variable density or variable area method.

Broadly, my invention may be produced by the simultaneous use of two or more of the previously known systems of recording or reproduction, though to get adequate results it is necessary to have a comparatively elaborate system in connection with a motion picture, and the actual multiple sound record which is the fundamental feature of my invention may be made before, with or after its associated motion picture, or two or more records may be made independently for simultaneous use with a motion picture. The sound impressions of separate records (separate sound "tracks") are preferably built up by tube amplifiers on independent amplifiers and loud speakers.

In order to reproduce the sound effects originally present in the taking of a motion picture or associated therewith it is necessary that means be provided to make a sound record with these qualities recorded thereon on two or more separate sound tracks; and while both the means for so recording and the record so produced are separate and distinct inventions, they are not useful as such unless used in reproducing equipment or means according to my further invention therefor; and it may be said that three separate inventions are necessary and contribute to the single object of properly reproducing the sound effects that may be originally present in the taking of a motion picture or associated with its reproduction.

The preferred form of my invention is described herein, reference being had to the accompanying drawings, in which Fig. 1 is a more or less diagrammatic plan of the arrangement for recording the sound qualities upon a "sound film"; Fig. 2 is a very similar plan of the arrangement for reproducing the desired sound qualities from the "sound film" (records or sound tracks); Fig. 3 is an illustration of a preferred form of sound film; Fig. 4 is a modified form of sound film having the motion picture thereon (as has been previously used with a single sound track); Fig. 5 is a cross sectional illustration of a group of sound recording heads to correspond to Fig. 3; Fig. 6 shows the aperture plate which controls the passage of light to or through the sound film; and Fig. 7 is a cross sectional illustration of the sound "pick up" elements or sound head for reproduction. Figs. 6a and 7a show modified forms of aperture plates. Fig. 8 is a relay.

My invention may make use of the primary elements of any other well known system using heretofore a single sound track, such as those in extensive use under the commercial names of Movietone, Photophone, and Vitaphone; and the term record or sound track refers to the recorded sound impression on any kind of a film or disk or other record; while the term "multiple sound track" refers to two or more separate sound tracks whether they be on the same film or disk or entirely separate (as long as they may be used in harmony), as any of the above well known systems are interchangeable and may be used entirely or in combination in my invention.

My invention relates mainly to the distinct or separate recording of two or more sounds which differ from each other in some perceptible quality, and the reproduction of these sounds in harmony to reproduce this differing quality, and a switching arrangement to elaborate or vary the placing of the sound in relation to the moving picture screen (generally in accord with the moving picture).

In the preferred form of my invention, I divide up the picture area and space surrounding the moving picture screen into sixteen or more separate and distinct parts, and all recording is with a view to the more or less distinction of sound upon or in relation to any or all of these parts. While similar results may be obtained in a limited way with a number of disk records used at one time, the preferred form of my invention uses a standard motion picture film upon which there are recorded impressions having a combination of sixteen or more separate and distinct qualities or individual characteristics effecting or controlling the sound that may be reproduced.

By breaking up or separating the sound both in recording and reproduction, as for instance in an orchestra composition, I eliminate the "machine made" or artificial sound quality generally associated with reproduced sounds. Where sounds are reproduced in correct time with a motion picture they are said to be synchronized, whether the sounds are associated with the picture itself or accompany it as (for instance) a musical composition.

In order to describe my invention as clearly as possible, the effects generally present more or less together are described separately.

One quality which I reproduce is the effect or "sense of direction" of the sound of which a sound record must first be made having this quality impressed thereon, which is accomplished in my invention by recording the "variable intensity" of the sound upon separate sound tracks according to the direction.

In Fig. 1, the moving picture camera I is represented as driven by the synchronous electric motor 2 which also drives the sound recording machine 3 by means of a common shaft 4, and the arrangement is such as might be used to take a moving picture at the same time as the sound associated therewith is recorded. The film upon which the sound is recorded is preferably the same kind of standard film as that upon which the motion picture is taken; and the entire construction of the sound recording machine may be exactly like that of its connected camera, except that the intermittent motion of the camera is left out of the sound recorder, and the camera lens is replaced by a sound recording head (Fig. 5). Both the camera and sound recorder are alike and equivalent to each other except that the sound recorder is adapted to photograph the sound impressions instead of a picture, and the film runs steadily past the sound recording aperture instead of intermittently as in the camera; and the sound recording machine is therefore essentially a sound camera.

With a person at position A (Fig. 1) in action turning in the directions A1, A2, and A3, there will be a variable intensity of sound produced, which is strongest in the direction in which the person is facing. Microphones 5, 6, and 7 are used to pick up the sound from A according to the direction, and the impulses picked up by each microphone (mike) are conveyed over separate amplifying channels to its own individual recording head which makes a separate and distinct sound record thereof upon its own individual sound track; so that the separate mikes and connected parts operate to make separate sound records, each of which records will vary in intensity according to the direction in which the person at A may be facing. These mikes are preferably of moderate sensitivity so that they will pick up the full intensity of sound only when for instance spoken directly into, and the proportion of sound picked up by each mike will fade or be greatly reduced as the person at A turns away from same; so that three mikes placed as shown will pick up sounds from three directions.

With the person at A facing in the direction A1, (where mike 7 will pick up only a minor sound if any) mike 5 will pick up the fullest intensity of sound which will be transmitted through its own channel amplifier 5A to recording head 5B which makes the sound record on sound track 5C of sound film 8 (Fig. 3); while mike 6 will pick up a sound of lesser intensity which will be conveyed through its own channel amplifier 6A to recording head 6B which makes the sound record therefor also on sound film 8 on sound track 6C; and at this time mike 7 will pick only a negligible sound which however will be transmitted through its own channel amplifier 7A to recording head 7B which makes its own individual record on film 8 on sound track 7C. There will thus be made three separate records of "the same sound", which however differ from a maximum intensity on the record 5C to a medium intensity on the record 6C and a negligible intensity on the record 7C. Now, with the turning of the person at A (from the direction indicated at A1) to the position indicated by direction A3, it will be apparent that the sound energy will be transferred in its greatest intensity to sound track 6C and then to sound track 7C, which is the reverse of that from position A1. This varying degree of recorded sound can be faithfully reproduced by suitably placed loud speakers as hereinafter described, so as to reproduce an effect in sound reproduction corresponding to the turning of the person as shown in the projected picture at position A.

For illustration, it may be assumed that the person at A is a singer who requires an orchestra accompaniment, and this accompaniment is also separately and distinctly made on its own individual sound track. The instruments of the orchestra are played and grouped about microphones 9, 9A, and 9B which are all connected to the mixer panel or box 9C (which controls the relative mixing of the sounds as usual) and this mixed sound from these mikes is conveyed through its own channel amplifier 9D to sound recording head 9E which makes its own individual sound record on sound film 8 on sound track 9F. This record from sound track 9 is reproduced individually so as to approximate the effect of separate orchestra accompaniment to the singer of (or corresponding to) the picture. There will thus be four separate sound records or tracks for the above purposes on the sound film, and for elaborate productions there may be more tracks or more films used simultaneously.

As the picture progresses, for illustration, it may be assumed that the singer changes to dancing from position B to C and so forth, and that this sound is to be reproduced in connection with the picture. At this point switch 10 is pressed and held in contact which lights up the electric light 10A to make a "switch track signal" recorded on the sound film rim (switch track record 10B), and this signal corresponds to the change in recording conditions which it is desired to reproduce; and at this time mikes 5, 6, and 7 are changed or "switched" (other mikes so placed may be switched in place of) to the dotted positions of Fig. 1. In this case the sound is recorded as before upon the same three separate and distinct sound tracks, and the sound will be recorded with a variable degree of intensity according to the position of the person in moving from positions B to C and so forth, which transfers the recorded sound energy from one sound track to the other.

Now if three persons be performing simultaneously at positions A, B, and C (one at each position), three separate and substantially independent records will be made at the same time corresponding to each person and the position of each person, and these records will interchange with each other according to the corresponding movements of all three persons.

It may be assumed for illustration that, as the action progresses, three persons at A, B, and C are playing upon three "different" instruments such as a violin at "A", a flute at "B", and a harp at "C". Under such conditions three substantially separate sound records will be made, one mainly (if not entirely) a violin record, one a harp record, and one a flute record; and it should be noted here that it is the reproduction of these instruments "as separate sounds" which gives the naturalness of sound reproduction so much desired. The minor background of sound which may be present in each record (of sounds of the other records) is not ordinarily perceptible when they are reproduced together as an ensemble.

As the action further progresses for illustration, it will be assumed that a large band or orchestra is to be recorded with full tonal effects. The conditions here involve the detail recording of a tremendous amount of sound energy which differs widely in frequency and individual energy characteristics. In my invention the composition of the band is preferably divided up as distinctly as possible into groups (which may be even carried so far as to make an individual sound record of each instrument, using an equivalent number of sound tracks), and four separate records are made of parts of the sound which forms the total or entire band. During this time switch 11 is pressed and held down, which lights lamp 11A and makes its own switch track signal on switch track 11B, which corresponds to the change in recording arrangement or the particular reproduction effects desired. Also during this time, all microphones and equipment may be fully used and operated simultaneously up to the full recording capacity of as many sound tracks as the record involves to form the whole.

The separate recording makes it possible to record the (say) violin part at its best tone recording level without regard to the (say) base drum which is recorded over its own channel at its own best tone recording level. Also this process makes possible the reproduction of the violin part upon one or more loud speakers which are individually best adapted to reproduce the same at the best tone level therefor, while at the same time reproducing the base drum upon a separate loud speaker best adapted to reproduce a base drum at its best tone level.

When this band composition is reproduced over distinct grouping of loud speakers spaced over an area or depth, there will actually be reproduced by my invention a sound production in space which corresponds to the original production, and the effect of separate instruments spread over a substantial space will be more or less actually reproduced. It should be noted in this connection that a number or group of loud speakers operated from the same channel amplifier or reproducing the sound which comes from only one sound track or record as previously used is entirely different from the distinct reproduction of separate records.

The function of the switch tracks as used in my invention is to automatically select different loud speakers spaced and directed according to the action which is shown in the motion picture so that the sound will actually come from the place where the motion picture shows it to come from, as nearly as possible in actual practice; as distinct from previous construction where all sounds generally come from the same place, speaker or group of speakers; and this selective action continually varies in accordance with the switch track signals. These switch tracks may also control the amplifier action or accessory equipment such as real sound producing devices (as distinct from reproduced sounds).

The actual detail recording of the sound impression on the film may be made in any known manner by means of light on a photographic surface, but on account of the small space available I use both sides of the film in recording to give more room for the recording heads. A recording head is that part which varies the light on the film in accord with the sound, and a switch track recording head may be the same construction if desired, though for ordinary purposes an ordinary controlled light is sufficient. In this recording it is preferable that the same synchronized point for all sounds shall be on the same cross line on the film, in order that the film may be cut at the same sound point and also that the sound impressions may be reproduced from the same cross line. Where a glow lamp 12 (Fig. 5) is used for recording, its light may be focused by lenses 13 on the film sound track through a very narrow slot 15 (Fig. 6) in the aperture plate 14, the whole being enclosed to confine all light except that passed to the film track. Where a fixed light 16 is used for recording, the mirror 17 causes the light beam to vibrate across its aperture opening, the mirror being electrically operated substantially in the manner of any oscillograph instrument (or even possibly mechanically) to cause the aperture plate opening to be more or less than half illuminated, in accord with the sound vibrations, which makes a sound record by means of a variable area instead of density as with the glow lamp.

A somewhat limited application of my invention may be made on a standard motion picture film containing the motion picture, as has been customary with other single track systems, or a further limited application may be made by using a disk record in combination with a single track sound record on the motion picture film which is adapted or synchronized to be reproduced therewith in harmony as a double track sound reproducing system (part of the sound effects being obtained from each record).

In this modified form, which may be as shown in Fig. 4, I prefer to have the sound track 5C on one side of the picture and a second sound track 6C on the opposite side of the picture space, together with the switch tracks 11B and 10B on the outer edges of the film as before, as this provides four separate tracks without greatly reducing the picture area P; and these tracks may be picked up and amplified separately in the customary manner of single track systems. Such a film, if used with a synchronized disk record on equipment now in use, gives three sound tracks and selective control (switch track) of the loud speakers from the film.

The general arrangement for sound reproduction is very similar to that under which the recording normally takes place, and is intended to reproduce as nearly as possible the actual sound qualities as herein outlined. The recording system, the multiple record, and the reproducing equipment all appear to be essential to each other to produce the cycle of necessary operations that enable the original sound effects to be reproduced.

As, in the preferred form of my invention, there are six or more separate records (including the control signals) all of which are recorded in a very confined space on the same cross line (where the impressions are synchronized) of the film, I prefer to enlarge all of these impressions before picking up or separating the individual track impressions; and the optical system for this purpose is practically identical (except as to detail proportions) to that of a standard motion picture projector, as is illustrated in Fig. 7 which is a cross section illustration of the "pick up" head (group). The construction of the "sound pick up machine" 23 (Fig. 2) is essentially a duplicate of the standard projector 21 with which it is used, except that it is adapted to the pick up of sound impressions from the film instead of pictures (as the recorded sound impressions are in reality pictures of sounds). The synchronous motor 22 drives both projector and sound machine by common shaft 24, and the whole arrangement is very similar to that for recording. Also, as in recording, the intermittent movement is left out of the sound machine so that the film runs steadily past the "pick up gate" or aperture.

In Fig. 7, as in the projector, the single source of light 25 has its beams 27 focused or directed by lenses 26 upon the aperture plate 28 (frame), and the light passes through the very narrow slot 29 on to the passing sound film 8. The light passing through the film is spread out or magnified by lens 30 which focuses an enlarged image on the group of photoelectric cells which convert this light into electrical impulses corresponding to sound or controlling signals. The light passing through each sound or signal track is thus focused upon its own individual pick up photo cell, the impressions of switch track 11B passing to cell 11C, of 10B to 10C, of 5C to 5D, of 6C to 6D, of 7C to 7D, and of 9F to 9G.

The detail Fig. 8 represents a relay switch having three connections "a, b, and c", and any desired number of these relays may be used for the purpose of switching loud speakers or other devices. The line from "a" normally contacts with "b", but when the relay is energized it contacts with "c"; and with a number of these relays in series set to operate on successively increasing signal energy, each will connect a different (in this case) speaker (or group of speakers) in line. Practically an unlimited number of switching combinations may be had with the desired number of connections and relays to correspond which is a matter of ordinary working out of circuit diagram connections.

Each photo cell is connected to its own individual amplifier as shown, from where the sound energy is passed to selected loud speakers subject to relay switch control; and there are thus separate channels from each sound or signal track which separate effect is reproduced on selected loud speakers. The signal from switch track 10B is picked up by cell 10C (signal head) and passes to connected amplifier 10D to connected relay box 10E which selects the speakers, and likewise the signal from 11B passes through 11D to relay box 11E which also selects assorted speakers. The sound impression from the record on sound track 9F passes from cell 9G through amplifier 9H to relay switch in box 10E and (say) to connected loud speaker "A", while that of track 7C passes from cell 7D to amplifier 7E to relay box 10E to (say) loud speaker indicated as directed by arrow A3, that of track 6C passes from cell 6D to amplifier 6E to relay switch in relay box 11E to (say) connected loud speaker indicated as directed by arrow in directon A1, and the sound impressions on sound track 5C pass from cell 5D to amplifier 5E to relay switch in box 11E to (say) the large loud speaker H of the horn type.

The picture screen (preferably of the kind that allows the sound to pass through) indicated at S has for illustration three groups of small speakers at positions A, B, and C of which some are turned to the right and others to the left as well as others to the front; and there may be other speakers turned up or down or spaced in front or back or even away from the screen; while the large horn speaker is for general effect as compared to the definite local action of each small speaker.

The action in reproduction corresponds to the former illustration of the person at A in recording in the three directions A1, A2, and A3; as the recording in the direction A1, of Fig. 1, is reproduced on speaker A4 in the direction A1 of Fig. 2, and that recorded in the direction A3 is reproduced in the same direction by speaker A5. Therefore in action corresponding to the picture being shown on the screen at "A", there will be reproduced a localized and directed sound as nearly as possible at the same place as the picture, which will change in direction in accord with the movements of the picture, and this is accompanied by the orchestra sound reproduced for general effect by the large horn speaker H.

As the action changes in reproduction, the signal on the film switch track or tracks operates relay switches in relay boxes 10E or 11E which thereby selects different speakers to correspond to the action shown on the picture, and it may be assumed at this point that speakers A, B, and C, facing in the direction A2, are connected and reproduce the sound effect corresponding to the movement of the person in the picture in changing from position A to position B to position C and so forth. As the action progresses, three persons playing on different instruments at positions A, B, and C, in the picture, will have their own individual sounds reproduced at the place where the picture shows them to be, and the sounds will interchange on the separate speakers to correspond with the interchange of position of the three performers as shown in the picture. During the action, if one person at B talks to another at C, the sound will be reproduced back and forth at the proper relative positions and direction, by the automatic selection of the proper speaker.

As the picture changes to show a full band, orchestra, or chorus, in a massive effect, the corresponding signals on the switch tracks act to connect the entire loud speaker system with all speakers in action if desired, including B4, C4, D4 and D5; and the action may be reproduced in sound back and forth, up or down, sideways, and in mass, in an almost unlimited manner.

Speakers may be placed entirely away from the picture screen to produce sound effects associated therewith, and my invention is illustrated as being able to play a disk record 31 which may be reproduced with a suitable pick up 32 that can at times be connected to any amplifier. The modified film record of Fig. 4 containing the picture (which picture is synchronized at a point on the film at a suitable distance from the same sound point) may be run directly through the motion picture projector alone where the sound and signal impressions are picked up (at some point below the projector head) by means of suitable "pick ups" or sound heads practically equivalent to that shown for the sound machine 23.

My invention may at times use all three kinds of records as each has desirable qualities.

It should be noted that the complete system may be used, particularly in relation to the sound, whereby all of the sound effects may be reproduced either in connection with or independently of the recording. This is particularly illustrated in the drawings by the combined Figures 1 and 2, wherein switch 33 serves to interconnect the two parts, so that all of the sound impulses which may be impressed on that part of the system of Fig. 1 may also be impressed and reproduced upon that part of the system of Fig. 2, without regard to whether or not there is any recording at the time. As shown, switch 33 contains six pairs of contacts on the incoming side from Fig. 1, one pair being for each circuit leading to the recorder 3, one of which circuits is illustrated for clearness as coming down from 5A circuit to its contacts, it being understood a similar connection is made from each of the six circuits entering recorder 3 to a pair of contacts on the incoming side of switch 33. In the same manner six pairs of contacts on the outgoing side of switch 33 are in turn connected to the six circuits from the sound reproducer or head 23, one of which circuits is illustrated for clearness as going down from switch 33 to the circuit entering 11D, it being understood that a similar circuit connection is made from each of the six pairs of outgoing contacts to each of the six circuits from head 23, it being obvious that each circuit of Fig. 1 should be connected through switch 33 to its corresponding circuit in Fig. 2 so that the sound impulses originating in Fig. 1 will be reproduced in the system of Fig. 2 in the same manner in which it originates or is produced in Fig. 1. By means of suitable resistances 34 the strength of the impulses are controlled so that the output from the speakers of system Fig. 2 is the same as that intended from a recording, or to whatever sound level desired. When switch 33 is moved to the left of the illustration to make contact, all of the recording circuits of Figure 1 are connected through to the corresponding reproducing circuits of Fig. 2, and all of the effects of sound grouping, sound direction, and sound localization may be reproduced as described similar to that of a recording as previously described, this being obtainable either at the same time as a recording or entirely without any reference to any recording, it being understood that the audible system of Fig. 1 is not within the audible system (or hearing) of Fig. 2. Thus sound effects may be obtained in my invention, independently of recording process or a sound record.

It should also be noted in reference to the control of loud speakers for localizing sound, that each switch track controls more than one speaker by means of a light and a dark portion, and that by means of a relay as described the operation disconnects one speaker at the same time and with the same control impulse with which it connects another speaker to transfer the sound from one locality to another, and this action is multiplied by the interaction of one switch track with another switch track to any number of positions desired, according to the number of relatively light and dark portions on each switch track and the number of tracks used, which may be as many as desired.

It may be explained further in reference to sound character in relation to the objects of this invention, that to a certain extent the production of real music consists in the harmonious production of separate groups of sound which fundamentally is a matter of composition determined in the first place by the composer. The elements of sound composition relate to the character of each sound group and their harmonious reproduction as a sound composition. This may be illustrated in a simple manner by supposing a group of sounds as represented by a letter of the alphabet of distinct character, say W, a second group by the letter D, a third group by R, and a fourth group by O. These letters, each a distinct character, assembled in this order, WDRO, are not in harmony and have no meaning, but when assembled or "composed" in the order "WORD" have the harmony and distinct meaning "word". In a similar manner, separate groups of sounds of distinct character, reproduced together in harmony, form a sound composition in the natural manner of real music. This condition requires that sound shall be recorded in the natural harmonious parts of the composition as originally determined by the composer. In orchestral music there are two or three main parts around which the separate instrumentation is grouped, and these would be referred to as parts determined as composition or by the composer. The recording of these separate parts or groups of sounds, as composed by the composer, with sufficient distinction so that the reproduction will sound like real music and not like a phonograph record is what is sought to produce and claim as my invention.

This application is divided, and a separate application filed thereon for Motion picture and sound recording and reproducing equipment, Feb. 5, 1937, Serial Number 124,165.

Having described my invention, what I claim to be new and desire to secure by Letters Patent is:

1. A sound film having a multiple sound track recorded thereon, and a switch track also having a switching signal recorded thereon for the purpose of controlling the recorded sounds in relative reproduction upon separate speakers as described.

2. In a sound reproducing system, multiple photo cell pickups, separate channel amplifiers connected to each pick up, a multiple system of loud speakers, and a switching system whereby the separate impulses from each channel may be interchanged or transferred by selection to various speakers as desired.

3. In a sound recording and reproducing system, a multiple channel recording system and connections whereby the same may be connected to a multiple channel reproducing system, whereby the sound impulses may be simultaneously picked up and recorded and also simultaneously heard upon a reproducing system as produced and recorded.

4. In a sound reproducing system, light sensitive means to pick up two or more sound records, means to reproduce the separate sounds through separate channels and speakers, and light sensitive means to control the transfer of sound to or from additional speakers corresponding to variations of movement of one or more subjects of a motion picture.

5. A sound film having two or more sound tracks photographically recorded thereon by means of separate light impressions directed on the film from opposite surfaces, each sound track being independent of the other in its spacing so that the individual recordings are independent of each other as described, whereby the light for recording is directed on the film from two opposite directions as illustrated and described.

6. In a sound reproducing system, a photo electric pick up head having a multiple of pick up units, and a lens to collect the light from a record to separate and direct a multiple channel light beam and direct the same on the individual units as described for the purpose of separate effects.

7. A sound film having a sound recorded thereon, and a separate track having a switching signal recorded thereon in a substantially continuous path for the purpose of controlling the placement of the recorded sound, said signal record being adapted to control the sound while the film is in motion substantially the same as the sound record.

8. For a sound reproducing system, a film having a switch or signal control record photographed thereon in a substantially continuous path as described for the purpose of controlling the placement of sound as described.

9. For a sound reproducing system associated with a motion picture, a film having a switch track with a switching signal recorded thereon outside of the interrupted path of the motion picture, substantially as and for the purpose described.

10. In a sound reproducing system for a motion picture, separate speakers arranged to direct sound in three directions, and means to vary the intensity of sound on such speakers, whereby a variable directional sound effect may be reproduced corresponding to a similar directional quality of the subject of said motion picture.

11. In a sound recording system for a motion picture, means to make a sound record directly associated with and as produced by a subject of a motion picture, means to make a separate sound record of accompanying sound impulses independent of said subject outside of the picture zone, and also means to make a localizing or sound placement record, for the purpose of reproducing these qualities associated with a motion picture.

12. In a sound reproducing system, an electrical relay system controlling the placement or localization of sound, two or more loud speakers connected to said relay system, and means whereby a single impulse will operate to disconnect one speaker and connect another speaker through said relay, as and for the purpose described.

13. In a sound reproducing system, an interconnected relay system controlling the placement or localization of sound, two or more loud speakers connected to said relay system, and means whereby one relay will interact to disconnect a circuit through another relay and thereby provide a successive stage through which different speakers may be placed in operating connection by the combined action of both relays, as and for the purpose described.

14. A localizing or position sound control record having a relatively light and dark portion photographed thereon, in which the light portion corresponds to one desired position of sound placement, and the dark portion of which corresponds to a different position of sound placement, whereby each portion may be used as a position control for sound placement to effect a change of sound position as described.

15. In a sound reproducing system wherein two or more speakers are associated together in a combined sound effect, two or more amplifying channels, additional or a further multiple of loud speakers, and means to interchange or switch the connections to each channel to selected speakers so as to transfer a double associated sound from one place to another, as described.

16. In a sound reproducing system for a motion picture wherein two or more speakers are associated together to produce a combined sound effect, two or more amplifying channels, two or more speakers, and means to interchange or switch the connections of either channel to selected speakers as described to change the sound effects producible with any combination of two or more speakers.

HOWARD H. WIXON.